United States Patent [19]

Hansen et al.

[11] Patent Number: 5,559,205

[45] Date of Patent: Sep. 24, 1996

[54] SULFONATE-CONTAINING POLYESTERS DYEABLE WITH BASIC DYES

[75] Inventors: Steven M. Hansen, Kinston; James M. Howell, Greenville; Cecil E. Reese, Kinston, all of N.C.

[73] Assignee: E. I. du Pont de Nemours and Company, Wilmington, Del.

[21] Appl. No.: 443,744

[22] Filed: May 18, 1995

[51] Int. Cl.$^6$ .................................................. C08G 63/82
[52] U.S. Cl. .................... 528/279; 528/272; 528/275; 528/308.6; 524/413; 524/783; 524/779
[58] Field of Search ...................................... 528/272, 275, 528/279, 295, 308.6; 524/413, 783, 779

[56] References Cited

U.S. PATENT DOCUMENTS

| | | | |
|---|---|---|---|
| 3,018,272 | 1/1962 | Griffling et al. | |
| 4,110,316 | 8/1978 | Edging et al. | 526/68 |
| 4,113,704 | 9/1978 | MacLean et al. | 528/289 |
| 4,146,729 | 3/1979 | Goodley et al. | 560/94 |
| 4,945,151 | 7/1990 | Goodley et al. | 528/272 |
| 5,053,482 | 10/1991 | Tietz | 528/272 |
| 5,171,309 | 12/1992 | Gallagher et al. | 604/365 |

*Primary Examiner*—Samuel A. Acquah

[57] ABSTRACT

A process is provided for preparing basic-dyeable polyester polymer, and shaped articles therefrom, such as fibers, films and bottles, involving using the metal sulfonate salt of a glycollate of isophthalic acid as a polymerization catalyst in making ethylene terephthalate polyester copolymers. This reduces or even avoids the need to add a conventional polymerization catalyst, such as antimony trioxide, especially when making polyesters delustered with titanium dioxide.

10 Claims, 1 Drawing Sheet

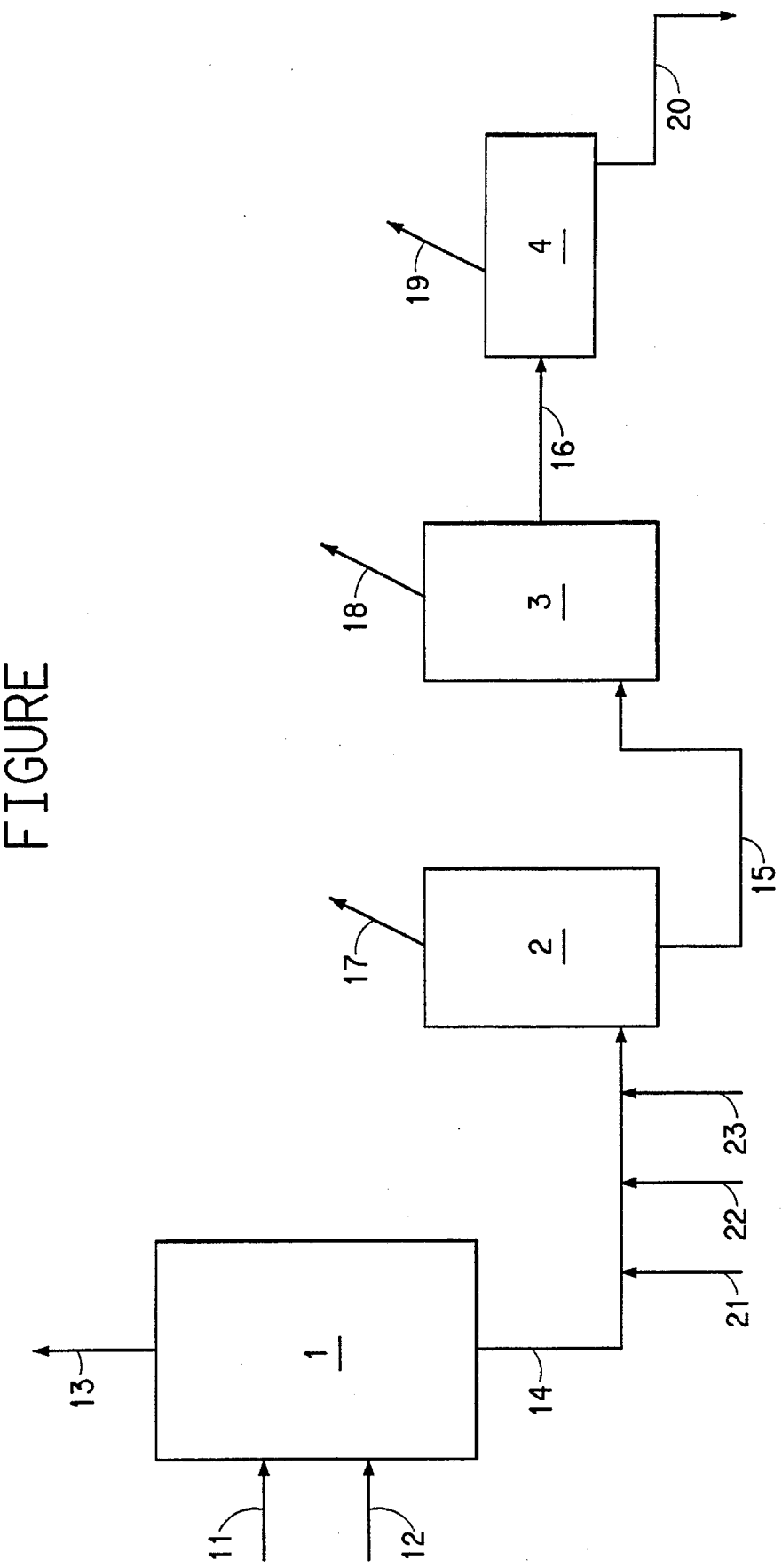
FIGURE

SULFONATE-CONTAINING POLYESTERS DYEABLE WITH BASIC DYES

FIELD OF INVENTION

This invention concerns improvements in and relating to sulfonate-containing polyesters that are dyeable with basic dyes and more particularly to their preparation by polymerization, to their processing and to resulting new compositions of matter and shaped articles.

BACKGROUND OF INVENTION

Polyesters have been produced commercially on a large scale for processing into shaped articles such as fibers, films and bottles, primarily from poly(ethylene terephthalate). Synthetic polyester yarns, for example, have been known and used commercially for several decades, having been first suggested by W. H. Carothers, U.S. Pat. No. 2,071,251, and then Whinfield and Dickson suggested poly(ethylene terephthalate) in U.S. Pat. No. 2,465,319. This polyester polymer has been used most frequently for commercial purposes and has been made from ethylene glycol and from dimethyl terephthalate or terephthalic acid; these polymer precursors have been conveniently reacted together commercially by ester interchange or by direct esterification, respectively, followed by condensation polymerization, generally in multiple stages, with appropriate provision to remove condensation products, such as water, and also excess ethylene glycol that is preferably recycled with removal of unwanted water and by-products, as appropriate, as described in the art, e.g., Edging and Lee, U.S. Pat. No. 4,110,316, MacLean and Estes, U.S. Pat. No. 4,113,704, Goodley and Shiffier, U.S. Pat. No. 4,146,729, and Goodley and Taylor, U.S. Pat. No. 4,945,151.

Originally, polyester yarns were made by batch operations, involving several separate processes, first making the polyester polymer, and then melt-spinning the polymer into filaments, and further processing the filaments into continuous filament yarns or staple fiber, as described, e.g., by Ludewig in "Polyester Fibres, Chemistry and Technology", first published in German in 1964, and then in an English translation by John Wiley & Sons Ltd., 1971. However, as indicated in the literature, there has always been a desire to economize, and so to couple various separate stages together. Some fiber manufacturers have operated a wholly continuous process, starting with the polymer precursors that are reacted together and then polymerized to form a polyester polymer melt that is extruded into solid filaments that are processed into continuous (multi-filament) yarns as a wholly continuous process, or into staple fiber (usually as a separate process). However, many manufacturers, in various countries, have not changed to a continuous process, because of the problems presented by continuous operations.

As indicated, although many polyester polymers (including copolymers) have been suggested, the polyester most widely manufactured and used hitherto for textile fibers has been poly(ethylene terephthalate), which is often referred to as homopolymer. Homopolymer has generally been preferred over copolymers because of its lower cost, and also because its properties have been entirely adequate, or even preferred, for most end-uses. It is known, however, that homopolymer requires special dyeing conditions (high temperature requiring super-atmospheric pressure) not required for nylon fibers, for example. Homopolymer is often referred to as 2G-T.

Poly(ethylene terephthalate/5-sodium-sulfoisophthalate) copolyester has, however, also been manufactured and used commercially in considerable quantities for some thirty years, especially for staple. This copolyester was first suggested by Griffing and Remington in U.S. Pat. No. 3,018,272. A very desirable feature of this copolyester is its affinity for basic (cationic) dyes. Commercially, such copolyester has contained about 2 mole % of the ethylene 5-sodium-sulfo-isophthalate repeat units. Such basic-dyeable copolyester has sometimes been referred to as 2G-T/SSI. This basic-dyeable copolyester has been regarded as important. It has long been highly desirable to make improvements in providing basic-dyeable copolyesters, especially for spinning into filaments for use as textile fibers.

As indicated in the literature, e.g., Chapter 4 of Ludewig's authoritative book, especially page 100, antimony trioxide ($Sb_2O_3$) has been "frequently mentioned in the literature and is in a class of its own" as a polymerization catalyst. When one reads the patent literature, most working Examples have used antimony trioxide as polymerization catalyst; e.g., nearly all Griffing and Remington's Examples used antimony trioxide; only Examples 13 and 18 did not use an antimony trioxide polymerization catalyst, but used tetraisopropyltitanate instead. We believe that antimony trioxide is far and away the predominant material that has been added for use as polymerization catalyst in actual commercial practice although there have been many complaints in the literature about disadvantages resulting from its use, and despite many suggestions for avoiding its use; e.g., WO 93/22367 (Mueller, Rhone-Poulenc Viscosuisse) suggests using a mixed catalyst consisting of 10 to 75 ppm of lithium and 15 to 80 ppm of germanium (which latter was already known as a useful catalyst). To summarize this aspect, an antimony polymerization catalyst is still believed to be used in commercial operations virtually exclusively, despite its well-known disadvantages, and it has long been known to be desirable to find a way to avoid such disadvantages.

As indicated in the literature, such as Chapter 4 of Ludewig, especially page 105, titanium dioxide ($TiO_2$) is a preferred delustering agent used for polyester fiber. So most commercial fiber is now delustered with titanium dioxide: amounts of 1–2% by weight have been used to make what is often referred to as "dull" fiber; amounts of 0.2–0.5% by weight of titanium dioxide have been used to make what is often referred to as "semi-dull" fiber; some "clear polymer" without any delustering agent is also used to make polyester fibers.

The present invention provides a novel process for preparing sulfonate-modified (basic-dyeable) polyesters of the type originally invented by Griffing and Remington with surprising advantages, especially in avoiding the prior art's reliance on adding an antimony catalyst in the condensation polymerization, and leading to new compositions of matter with improvements in processing and products.

SUMMARY OF THE INVENTION

Surprisingly, we have found, according to the invention, that lithium 5-sulfoisophthalic acid glycollate (often referred to herein as LISIPG), which can be written as bis(2-hydroxyethyl)lithium 5-sulfoisophthalate, acts as a polymerization catalyst itself in the preparation of such sulfonate-modified copolyesters, especially if added into homopolymer glycollate (HPG, bis(2-hydroxyethyl)terephthatate well-mixed with titanium dioxide. This reduces and may even avoid a need for using an antimony polymerization catalyst, as discussed herein. The resulting lithium salt-containing basic-dyeable copolyesters have given advantages when used as textile fibers. Similarly, NASIPG (the corresponding sodium salt glycollate) may be used as a catalyst for making the corresponding sodium salt-containing basic-dyeable copolyesters and textile fibers.

According to one aspect of the present invention, therefore, there is provided a continuous process for preparing basic-dyeable polyester polymer, involving reacting terephthalic acid, or a derivative thereof, with excess glycol to form a low molecular weight glycollate of terephthalic acid (HPG) in a first reaction zone, passing a stream of molten HPG from said first reaction zone to a condensation polymerization zone, carrying out condensation polymerization of said molten HPG to form the desired polyester polymer in molten state in said condensation polymerization zone, and cooling the resulting polymer to a solid, wherein an improvement comprises making delustered basic-dyeable polyester polymer by metering into said stream of molten HPG titanium dioxide, in amount 0.1 to 2 percent by weight, followed by metering in a metal sulphonate salt of a glycollate of isophthalic acid, in amount 0.5 to 5 mole percent, said percent amounts being calculated with respect to the polyester polymer that is prepared.

As indicated, the above aspect of the invention concerns making the basic-dyeable polymer in a continuous process, which may be coupled to a melt-spinning process or other process for making shaped articles from the melt, if desired. If desired, however, according to the invention, basic-dyeable polyester polymer may be cooled to a solid in the form of flake, chips or other known forms, such as have been described in the art.

The present invention is not restricted to operation of a continuous process. According to another aspect of the invention, there is provided a process for preparing basic-dyeable polyester polymer, involving reacting terephthalic acid, or a derivative thereof, with excess glycol to form a low molecular weight glycollate of terephthalic acid (HPG), carrying out condensation polymerization of said HPG in molten state to form the desired polyester polymer in molten state, and cooling the resulting polymer to a solid, wherein an improvement comprises making delustered basic-dyeable polyester polymer by mixing into said molten HPG titanium dioxide, in amount 0.1 to 2 percent by weight, followed by mixing in a metal sulphonate salt of a glycollate of isophthalic acid, in amount 0.5 to 5 mole percent, said percent amounts being calculated with respect to the polyester polymer that is prepared.

As will be evident, the above processes need not involve adding antimony trioxide as polymerization catalyst; avoiding adding antimony (for such a purpose) produces novel compositions of matter, with corresponding advantages in the resulting products. Most commercial sources of titanium dioxide do, however, contain antimony as a contaminant. So the resulting polymer compositions (and downstream products, such as fibers) will generally also contain antimony derived from the antimony contaminating any titanium dioxide added for delustering purposes, unless special precautions are taken.

The invention is not, however, restricted to making delustered basic-dyeable polyester fibers or polymer. Clear polymer and shaped articles may be prepared without using any conventional polymerization catalyst, such as antimony trioxide. Such a process is, however, somewhat slower, so it may be preferred to add small amounts of antimony trioxide or other polymerization catalyst in addition to using, e.g., LISIPG as polymerization catalyst.

According to another aspect of the invention, therefore, there is provided a continuous process for preparing basic-dyeable polyester polymer, involving reacting terephthalic acid, or a derivative thereof, with excess glycol to form a low molecular weight glycollate of terephthalic acid (HPG) in a first reaction zone, passing a stream of molten HPG from said first reaction zone to a condensation polymerization zone, carrying out condensation polymerization of said molten HPG to form the desired polyester polymer in molten state in said condensation polymerization zone, and cooling the resulting polymer to a solid, wherein an improvement comprises making basic-dyeable polyester polymer by metering into said stream of molten HPG a metal sulphonate salt of a glycollate of isophthalic acid, in amount 0.5 to 5 mole percent, said percent amount being calculated with respect to the polyester polymer that is prepared.

And, according to still another aspect of the invention, there is provided a process for preparing basic-dyeable polyester polymer, involving reacting terephthalic acid, or a derivative thereof, with excess glycol to form a low molecular weight glycollate of terephthalic acid (HPG), carrying out condensation polymerization of said HPG in molten state to form the desired polyester polymer in molten state, and cooling the resulting polymer to a solid, wherein an improvement comprises making basic-dyeable polyester polymer by mixing into said molten HPG a metal sulphonate salt of a glycollate of isophthalic acid, in amount 0.5 to 5 mole percent, said percent amount being calculated with respect to the polyester polymer that is prepared.

As indicated, the invention includes also new compositions of matter resulting from our new process aspects.

Thus, according to further aspects of the invention, there are provided basic-dyeable ethylene terephthalate copolyesters containing 0.5 to 5 mole percent, preferably about 1 to 2.5 mole percent, of a metal sulfonate salt of isophthalic acid, and containing less than 100 ppm of antimony, and preferably such copolyesters containing less than 50 ppm of antimony, especially up to about 20 ppm of antimony, it being desirable for the antimony content to be as low as possible, and even zero. However, as explained, even if no antimony is intentionally added for catalytic purposes, some antimony may be present as a contaminant.

BRIEF DESCRIPTION OF DRAWINGS

The Figure is a schematic representation of a 4-vessel continuous polymerization process that is modified for use according to the present invention.

DETAILED DESCRIPTION OF INVENTION

To provide a basis for understanding the present invention and the improvements we have achieved, a more complete understanding of details of prior art processes we have used in practice may be desirable. Reference may be made to the voluminous published art for information about all the different prior processes that have been suggested for preparing polyester polymers primarily based on poly(ethylene terephthalate), including those used for preparing sulfonate-containing polymers. For convenience, however, before discussing the improvements we have made according to the present invention, the next three following paragraphs briefly review processes we have been using in commercial practice.

As indicated hereinbefore, we have prepared poly(ethylene terephthalate), i.e., homopolymer, by a continuous polymerization process. The process of the present invention will, for simplicity, be described mainly by reference to such a conventional continuous process using 4 vessels, and to the Figure, and starting from dimethyl terephthalate (DMT). DMT has been the "derivative" of terephthalic acid (TPA) that has been generally used for making polyester polymers in commercial practice, but the literature discloses other derivatives that may be used instead. In such a process, an ester interchange reaction has been carried out in a first vessel 1 between molten dimethyl terephthalate (DMT) fed in at 12 and ethylene glycol (2G) fed in at 11 in the form of a catalyzed glycol stream. Low molecular weight material (referred to herein generically as "HPG", for homopolymer glycollate, i.e., glycollate of terephthalic acid) is removed through line 14 and passed to a second vessel 2, where polymerization is carried out to form polymer that is still of low molecular weight. This low molecular weight polymer is pumped through line 15 to a third vessel 3, where polymerization is continued, and the resulting polymer is passed through line 16 to a fourth vessel 4, which is often referred to as a finisher, where polymer of the desired viscosity (measured herein as LRV) is prepared for spinning. The catalysts have been pre-mixed with antifoam and the 2G to form a stream of buffered catalyzed glycol that is fed into the first vessel 1 at 11. The glycol has been buffered (e.g., with sodium acetate) to retard formation of diethylene glycol (DEG). Some ingredients may be added, if desired, in line 14 leading from vessel 1 to the second vessel 2; for instance, phosphoric acid is usually added to tie up the ester interchange catalyst. Manganese acetate has been used as an exchange catalyst in vessel 1, and antimony trioxide as polymerization catalyst, which may be added with the interchange catalyst or in line 14.

When terephthalic acid (TPA) is used as starting material instead of DMT, the polymerization stages may be rather similar, but the first stage is a direct esterification process in vessel 1, instead of an ester interchange reaction. Thus, 2G and TPA are fed into vessel 1 and reacted to form what is often referred to as molten oligomer (low molecular weight polymer, and what is referred to herein for generic simplicity also as HPG) which is passed via line 14 to vessel 2. Materials have been added along line 14 by injection, including phosphoric acid with extra 2G (referred to as titration glycol, to adjust mole ratios of 2G:TPA), then titanium dioxide and antimony trioxide polymerization catalyst.

For making basic dyeable copolyester instead of homopolymer (2GT), we had followed essentially what was taught by Griffing and Remington; we had modified the above-mentioned continuous process starting from DMT, in that we had added the sodium salt of the dimethylester of 5-sulfoisophthalic acid (5SI) separately into the first vessel 1, in which the ester interchange takes place, manganese acetate (ester interchange catalyst) and antimony trioxide (polymerization catalyst) being fed in as part of the stream of catalyzed glycol (2G), although the antimony trioxide can be added later, and phosphoric acid being added in line 14 to tie up the ester interchange catalyst.

As indicated above, the essence of the present invention is that we have modified the process that we had previously used in practice to prepare a basic-dyeable polyester polymer (i.e., copolymer of ethylene terephthalate and of a sulfoisophthalic acid, the latter in the form of its metal salt) by (1) using the glycollate of the latter (the sulfoisophthalate ingredient) as a polymerization catalyst, (2) reducing the amount of conventional polymerization catalyst that had previously been used, generally antimony trioxide, and (3) where titanium dioxide is used as delusterant, adding the glycollate that acts as polymerization catalyst after the delusterant has been well mixed into the molten ingredients.

5-Sulfoisophthalic acid (5SI) has been the preferred sulfoisophthalic acid and has previously been incorporated into commercial basic-dyeable polyester as its sodium salt. The lithium salt is, however, preferred according to the present invention, as will be related. Sodium salts, however, also give useful results, as will be seen hereinafter. The precise amount will often depend on whether it is desirable for the eventual shaped articles to have better affinity for basic dyes (i.e., to dye more deeply), in which case more of the metal sulfonate should generally be incorporated, or to have more strength, in which case lower amounts of the metal sulfonate may generally be incorporated. The precise amounts of the metal sulfonate salt are generally between about 1 and about 2.5 mole percent in the final polymer, generally being a good balance between good dyeability and tenacity (of fibers and yarns). The amount required of the lithium salt is generally less than of the sodium salt to get equivalent dye affinity. Other sulfophthalic acids may be used, if desired, but have not in the past given as good results in practice.

An important practical advantage of using the process of the invention is the reduction in the amount of antimony in the resulting polymer. This is expected to show up in commercial practice, for example, in a reduction in the spinning problems that have been encountered heretofore. This has long been desirable, but has not previously been achieved in practical operation.

These low contents of antimony contrast with much higher contents, typically ranging upwards from 180 ppm, that we have analyzed in commercial products of basic-dyeable copolyesters, which have all been sodium salts. So far as we are aware, the only basic-dyeable copolyester copolymer that has previously been available commercially has been the aforementioned ethylene terephthalate copolymer containing a small content of the sodium salt of 5-sulfoisophthalic acid (5SI); the amount of the 5SI may have varied somewhat, for instance down to about 1.4 mole %.

Further advantages have been found in the use of lithium as the metal salt over the sodium salt that has always been used previously in commercial practice. These advantages seem to derive from the ability to achieve polymer of higher molecular weight at operable melt viscosity, which provides filaments of higher tenacity and/or elongation, resulting in lower numbers of broken filaments during processing, thus permitting, for example, higher texturing temperatures to obtain higher bulk levels and/or higher texturing speeds and/or higher texturing tensions, fewer texturing breaks and an ability to texture lower deniers of filaments and/or yarns, and permitting applications requiring such higher tenacities and/or elongations. Some of these advantages will be apparent in the following Examples.

The following Examples further illustrate the invention. It will be noted that the amounts of sulfonate salt modifier incorporated in the final polymer are generally calculated with respect to mole contents of the residues of the diacid components, and are listed as "Copol, mole %". In contrast, DEG content is calculated as weight % of the polymer (DEG being diethylene glycol and being a byproduct that is not generally desirable). The anitomony content in ppm was measured by X-ray fluorescence procedure, as commonly used in the art for analyzing the content of each metal in polyester. Most of the fiber properties are conventional tensile and shrinkage properties, measured conventionally, as described in the art cited. "BOS" is for boil-off shrinkage. "DHS" is for dry heat shrinkage, measured at 160° C.

"DT,g" indicates the draw tension, in grams, and was measured at a draw ratio of 1.7X, a speed of 185 ypm (about 170 meters per min.), and 185° C. for texturing feed yarns, e.g., in Tables 1A, 1B, 1C, 2B, and 7A, and was measured at a draw ratio of 1.4X and a speed of 150 ypm (about 140 meters per min.), at the same temperature of 185° C., for direct use yarns in Tables 7B and 7C. Leesona Shrinkage is a standard test for measuring bulk in a textured yarn; a higher Leesona Shrinkage indicates a bulkier yarn.

Relative viscosity is often referred to herein as "LRV", and is the ratio of the viscosity of a solution of 80 mg of polymer in 10 ml of a solvent to the viscosity of the solvent itself, the solvent used herein for measuring LRV being hexafluoroisopropanol containing 100 ppm of sulfuric acid, and the measurements being made at 25° C., as described in Broaddus U.S. Pat. No. 5,104,725 and in Duncan U.S. SIR H1275.

Although we believe that continuous polymerization has advantages over batch operations, and so the Examples are mainly directed to continuous processes, batch processing may still be used, as will be seen. As will be understood, the precise operating conditions may be varied, as described in the art. For instance, some processes may prefer to use a 3-vessel process, by using only 2 polymerizing steps.

EXAMPLE 1

Polymer was prepared, using a prior art 4-vessel continuous polymerization system (as illustrated in FIG. 1) coupled to a melt-spinning machine. In such a process, an ester interchange reaction has been carried out in a first vessel 1 between molten dimethyl terephthalate (DMT) fed in at 12 and ethylene glycol (2G) fed in at 11 in the form of a catalyzed glycol stream. Low molecular weight material referred to herein as "HPG" (for homopolymer glycollate), i.e., glycollate of terephthalic acid, is removed through line 14 and passed to a second vessel 2, where polymerization is carried out to form low molecular weight polymer. This low molecular weight polymer is pumped through line 15 to a third vessel 3, where polymerization is continued, and the resulting polymer is passed through line 16 to a fourth vessel 4, which is often referred to as a finisher, where polymer of the desired viscosity is prepared for spinning.

According to the present invention, polymer is prepared from dimethyl terephthalate (DMT), bis(2-hydroxy ethyl) lithium 5-sulfoisophthalate (LISIPG), and, as the glycol component fed to the reaction, ethylene glycol (2G); the polymer also contained diethylene glycol (DEG) which was generated in the reaction process.

Exchange catalyst(s), antifoam and 2G were premixed to form the stream of catalyzed glycol. The exchange catalyst was manganese acetate (MnAc) mixed with lithium acetate (LiAc) in a mole ratio of 9:1 LiAc:MnAc. The lithium acetate was used to buffer the mixture to retard formation of DEG. No polymerization catalyst was added to this catalyzed glycol stream. The catalyzed glycol stream was fed via line 11 into the first vessel 1 where the ester interchange reaction was carried out. Pure DMT was metered directly into the first vessel 1 as a separate stream at line 12. The catalyzed glycol stream was adjusted to give approximately 100 ppm Mn in the final polymer. The mole ratio of 2G to DMT was approximately 2:1. The temperature of the first vessel 1 ranged from approximately 65° C. at the top of the column to approximately 240° C. at the bottom. Methanol was removed at the top through line 13 (via a reflux condenser, not shown). The vessel was operated at atmospheric pressure with a residence time of approximately 60 minutes. Molten HPG (low molecular weight glycollate of terephthalic acid) was removed through line 14 and passed to the second vessel 2.

Various ingredients were injected into the HPG as it passed along line 14. The order of injection of the ingredients along line 14 proved to be very important, as indicated hereinafter when ingredients were added in a different order. TiO$_2$ should be added before LISIPG to prevent agglomeration of TiO$_2$ and/or sulfonate. Phosphoric acid can be added as the first or last additive. In this Example, sufficient phosphoric acid was added to the molten HPG first at injection point 21 to give approximately 100 ppm P in the final polymer. In addition, a slurry of TiO$_2$ in 2G was added at injection point 22 and its injection rate was adjusted to give approximately 0.3 wt % TiO$_2$ in the polymer. Following these injections, a solution of approximately 20% by weight of bis(2-hydroxy ethyl) lithium 5-sulfoisophthalate (LISIPG) in 2G with lithium acetate (as buffer) was added at injection point 23. The LISIPG stream injection rate was adjusted to give 1.4 mole % of LISIPG in polymer. The total lithium acetate from the catalyzed glycol and from the LISIPG stream was approximately 125 ppm Li based on the polymer. As will be indicated hereinafter, the amounts added can also have an important effect on the course of polymerization and the resulting polymer.

The mixture was then introduced into the second vessel 2 where the temperature was increased to about 245° C. and the pressure was reduced to about 120 mm Hg with a residence time of about 30 minutes. Excess 2G was removed through a vacuum system at 17 and polymerization was initiated to form low molecular weight polymer material, which was then pumped through line 15 to the third vessel 3 where the temperature was increased to about 272° C. and the pressure was reduced to approximately 45 mm Hg, as more 2G was removed through a vacuum system 18 over a period of about 10 minutes.

The resulting prepolymer was then transferred through line 16 to the fourth vessel 4 where the temperature was controlled at approximately 280° C. and the pressure was reduced to about 8 turn Hg, being controlled automatically to maintain polymer melt viscosity as determined by an in-line viscometer. After about 200 minutes, some of the polymer was recovered and found to have a relative viscosity (LRV) of approximately 18. Upon analysis, the polymer composition was determined to be composed of acid-based units having a mole ratio of about 98.6/1.4 mole % of T/LISIP and glycol-based units of about 97.5/2.5 weight % of 2G/DEG.

The polymer was spun using conventional polyester fiber melt-spinning (S-wrap) technology into partially oriented filaments by extruding through orifices (of about 0.25 mm diameter) of a spinneret maintained at a temperature such as required to give a polymer temperature of approximately 295° C. The filamentary streams leaving the spinneret were quenched with air at 21° C. (17° C. wet bulb), collected into bundles of 34 filaments, approximately 0.4 wt % of a spin finish was applied, and the filaments were interlaced and collected at about 3000 meters per minute as a 34-filament yarn.

Yarn properties are shown in Table 1A (under LISIPG), and are compared with those of a commercially-available prior art yarn containing 2 mole % of the corresponding sodium salt (under Na salt), and also of yarn prepared similarly according to the invention from polymer made with about 1.4 mole % of NASIPG, instead of the LISIPG.

TABLE 1A

|  | 1.4 Mole % LISIPG | 1.4 Mole % NASIPG | 2.0 Mole % Na Salt |
|---|---|---|---|
| Copol, Mole % | 1.42 | 1.48 | 2.0 |
| DEG, Wt % | 2.53 | 3.85 | 4.04 |
| LRV | 18.1 | 16.4 | 13.5 |
| Spin Speed, ypm | 3243 | 3312 | 3459 |
| (mpm) | (2965) | (3028) | (3163) |
| Denier | 247 | 243 | 247 |
| Ten, gpd | 2.0 | 1.9 | 1.7 |
| $E_B$, % | 147 | 145 | 138 |
| Mod, gpd | 23.0 | 23.3 | 24.3 |
| DHS, % | 67 | 67 | 68 |
| BOS, % | 63 | 62 | 61 |
| DT, g | 91.3 | 90.6 | 88.5 |
| DRAWN YARN PROPERTIES (1.6X Draw Ratio) | | | |
| Ten, gpd | 3.7 | 3.2 | 2.8 |
| $E_B$, % | 39 | 38 | 34 |
| Leesona Shrinkage, % | 41 | 37 | 37 |

Thus, the yarn of the invention made with LISIPG showed significantly superior tenacity over either yarn containing the corresponding sodium salt, it being understood that the polymer and yarn made with 1.4 mole % NASIPG is also according to the invention, in contrast to the commercially-available yarn having 2.0 mole % Na salt which had the lowest tenacity, and which provided an ability to dye roughly equivalent to that now provided by the yarn according to the invention containing only 1.4 mole % LISIPG.

It proved possible to get more bulk (as shown by a higher Leesona Shrinkage) in the yarn of the invention made with lithium salt, than in either of the yarns encountered with sodium salt.

More procedures are described hereinafter, and are included in this same Example, but the above procedure, using LISIPG, is what is intended when we refer hereinafter to the procedure of EXAMPLE 1.

Some polymer made by essentially the same procedure (but of 17.7 LRV, and with 1.45 mole % of LISIPG and 2.4 wt % DEG) was spun into a 200 filament low dpf partially oriented yarn, and then drawn to subdenier filaments, using a spinneret heated to such temperature as required to obtain a polymer temperature of 293° C. and extrusion orifices of approximately 0.23 mm in diameter. Yarn properties are shown in Table 1B, showing its tenacity is higher than that of a yarn made with 1.4 mole % the NASIPG, also shown in Table 1B. When attempts have been made to spin such low dpf yarns using commercially-available polymer containing 2 mole % of the sodium salt made by standard polyester polymer technology, the filament bundle has been too weak to allow continuous spinning of a threadline from such polymer. In other words, the polymer and yarn made using 1.4 mole % NASIPG, according to the invention, are superior to what has been available commercially.

TABLE 1B

|  | LISIPG | NASIPG |
|---|---|---|
| Copol, Mole % | 1.45 | 1.40 |
| DEG, Wt % | 2.42 | 2.42 |
| LRV | 17.7 | 15.7 |
| Spin Speed, ypm | 2501 | 2501 |
| (mpm) | (2287) | (2287) |
| Denier | 211 | 211 |
| Ten, gpd | 2.1 | 1.8 |
| $E_B$, % | 136 | 142 |
| Mod, gpd | 25.3 | 25.6 |
| DHS, % | 54 | 58 |
| BOS % | 50 | 58 |
| DT, g | 138.0 | 117.3 |
| DRAWN YARN PROPERTIES (1.6X Draw Ratio) | | |
| Denier | 133 | 133 |
| Ten, gpd | 3.3 | 2.8 |
| $E_B$, % | 45 | 39 |
| BOS | 24 | 25 |

Essentially the same procedure as for Table 1B was used, except that the 200 subdenier filaments were spun directly, total as-spun yarn denier being approximately 150 denier. Yarn properties are shown in Table 1C, and those made with 1.4 mole % LISIPG are compared with those made with 1.4 mole % NASIPG, and again show superior tenacity compared to fibers made using NASIPG. As indicated, attempts to spin such yarns from commercially-available polymer made with 2 mole % of the sodium salt using standard polyester technology have not been successful, because the filament bundle has been too weak to allow continuous spinning of a threadline from such polymer.

TABLE 1C

|  | LISIPG | NASIPG |
|---|---|---|
| Copol, Mole % | 1.45 | 1.41 |
| DEG, Wt % | 2.42 | 3.00 |
| LRV | 18.2 | 15.9 |
| Spin Speed, ypm | 2501 | 2501 |
| (mpm) | (2287) | (2287) |
| Denier | 151 | 152 |
| Ten, gpd | 2.2 | 1.9 |
| $E_B$, % | 127 | 123 |
| Mod, gpd | 27.3 | 27.5 |
| DHS, % | 39 | 51 |
| BOS, % | 38 | 49 |
| DT, g | 128.5 | 107.0 |
| DRAWN YARN PROPERTIES (1.6X Draw Ratio) | | |
| Denier | 96 | 95 |
| Ten, gpd | 3.4 | 3.1 |
| $E_B$, % | 30 | 35 |
| BOS, % | 19 | 17 |

Some polymer made by essentially the same procedure, but with a relative viscosity of 16 LRV, was also spun using conventional polyester staple melt-spinning technology, by extruding filaments through orifices (of about 0.38 mm diameter) of a spinneret maintained at such temperature as required to give a polymer temperature of about 290° C., quenching them with air at 21° C. (17° C. wet bulb), collecting them into bundles (and applying a spin finish) at about 1500 yards (1372 meters) per minute as a single end of approximately 3200 denier containing 900 filaments. A tow was formed by combining 50 ends to give a total of 45,000 filaments and 160,000 total denier for staple drawing (some by single-stage-draw/steam-anneal and others by single-stage-draw/hot-roll-anneal) followed by crimping, drying, and curing into staple. Drawing conditions and resulting fiber properties are shown in Table 1D.

TABLE 1D

| ITEM | DRAW RATIO | ANNEALING CONDITION | DPF | TEN | $E_B$ | CPI |
|---|---|---|---|---|---|---|
| STEAM ANNEALED | | | | | | |
| A | 2.55 | 170 psi | 1.59 | 4.26 | 24.4 | 9.6 |
| B | 2.43 | 170 psi | 1.65 | 4.03 | 42.7 | 10.2 |
| C | 2.72 | 170 psi | 1.46 | 4.48 | 31.0 | 11.2 |
| D | 2.77 | 170 psi | 1.48 | 4.70 | 24.2 | 11.1 |
| E | 2.72 | 160 psi | 1.53 | 4.58 | 28.6 | 12.1 |
| F | 2.72 | 150 psi | 1.54 | 4.17 | 21.2 | 10.8 |
| G | 2.72 | 180 psi | 1.53 | 4.07 | 26.3 | 12.3 |
| HOT ROLL ANNEALED | | | | | | |
| H | 2.72 | 170 C | 1.45 | 4.80 | 22.1 | 9.6 |
| I | 2.72 | 160 C | 1.47 | 4.52 | 23.0 | 9.4 |
| J | 2.72 | 180 C | 1.44 | 4.96 | 18.3 | 8.8 |

The following variations were carried out, i.e., variations of the above successful polymerization procedure, to show the consequences.

COMPARISON A

The procedure of Example 1 was repeated, except that a solution of approximately 50% by weight of bis(2-hydroxyethyl) lithium 5-sulfoisophthalate (LISIPG) in ethylene glycol was added to the molten HPG at injection point 23. Poor mixing was observed and spherulites of sulfoisophthalate-rich polymer were formed. These particulates plugged the pack filtration media, resulting in rapid pack pressure rise rates, pack blinding and excessive pressure drops. In other words, injecting too high a concentration of the LISIPG into a stream of molten HPG can lead to difficulties in continuous polymerization, despite what was taught by Griffing and Remington, in U.S. Pat. No. 3,018,272, for example, in col. 8.

COMPARISON B

The procedure of Comparison A was repeated, except that the solution of approximately 50% by weight of LISIPG in ethylene glycol was added into a recycle loop at the bottom of the heat exchanger (first reaction vessel 1). Poor polymer finishability was observed with a maximum achievable relative viscosity of about 12 LRV, even at minimum finisher pressure. Large particulates containing sulfoisophthalate polymer and $TiO_2$ agglomerates were found on the pack screens and caused rapid pack pressure rise rates and pack blinding.

COMPARISON C

The procedure of Comparisons A and B were repeated, except that the solution of approximately 50% by weight of LISIPG in ethylene glycol was added to the 5th plate of the ester exchanger column (first reaction vessel 1). Improved mixing of the monomers in this process gave improved polymer homogeneity with lower pack pressure rise rates and the absence of sulfoisophthalate spherulites. $TiO_2$ particles were poorly dispersed and poor polymer finishability was observed with a maximum attainable relative viscosity of approximately 12 LRV.

COMPARISON D

The procedure of Example 1 was repeated, except that no $TiO_2$ was added to the liquid monomer prior to the addition of the 20% by weight solution of LISIPG. Poor polymer finishability was observed with a maximum attainable relative viscosity of approximately 12 LRV.

EXAMPLE 2

A procedure like that of Comparison D was repeated, except that antimony trioxide polymerization catalyst was added at injection point 22, i.e., prior to the addition of the solution of LISIPG. The level of addition of antimony trioxide polymerization catalyst was adjusted to obtain approximately 90 ppm Sb, i.e., approximately 30–50% of the level typically required for polyester polymerization. Operating conditions and polymer characteristics are shown in Table 2A, and show that additional polymerization catalyst was required to obtain clear polymer with a useful molecular weight. This indicates that an interaction between the LISIPG and the $TiO_2$ delusterant has an effect on the polymerization rate and promotes polymerization in the absence of additional polymerization catalyst.

TABLE 2A

| | VALUES |
|---|---|
| Operating Conditions | |
| Vessel 2 - | |
| Temperature, °C. | 246 |
| Pressure, mm Hg | 100 |
| Vessel 3 - | |
| Temperature, °C. | 273 |
| Pressure, mm Hg | 34 |
| Vessel 4 - | |
| Temperature, °C. | 280 |
| Pressure, mm Hg | 7.3 |
| Polymer Characteristics | |
| LRV | 18.3 |
| LISIPG, Mole % | 1.42 |
| DEG, wt % | 2.7 |
| $TiO_2$ | NIL |
| Sb, ppm | 90 |
| Mn, ppm | 119 |
| P, ppm | 140 |

Polymer was spun at approximately 3151 yards (2881 meters) per minute into partially oriented yarn following essentially the same procedure as in Example 1. The yarn properties are shown in Table 2B.

TABLE 2B

| | |
|---|---|
| Copol, Mole % | 1.42 |
| DEG, Wt % | 2.70 |
| LRV | 18.3 |
| Denier | 246 |
| Ten, gpd | 2.0 |
| $E_B$, % | 143 |
| Mod, gpd | 23.4 |
| DHS, % | 69 |
| BOS, % | 62 |
| DT, g | 90.3 |

EXAMPLE 3

The procedure of Example 1 was repeated, except that the injection rate of LISIPG was adjusted to give a lower level of LISIPG in the polymer, namely about 1.0 mole %. A finisher (vessel 4) pressure of approximately 6 mm Hg was used to obtain a polymer with a relative viscosity of about 17.6 LRV. The polymer prepared by this process was analyzed and found to contain 1.06 mole % LISIPG. It proved possible to increase polymer viscosity significantly, as shown in Table 3, by decreasing finisher (absolute) pressure.

TABLE 3

| FINISHER PRESSURE (MM Hg) | VISCOSITY LRV | MOLE % LISIPG (BY ANALYSIS) |
|---|---|---|
| 6.5 | 16.5 | 1.06 |
| 6.0 | 17.6 | 1.06 |
| 5.5 | 18.6 | 1.00 |
| 5.4 | 18.8 | 1.01 |
| 4.5 | 20.2 | 0.98 |

EXAMPLE 4

The procedure of Example 1 was repeated, except that the injection rate of LISIPG was adjusted to give 0.5 mole % of LISIPG in polymer, and a finisher pressure of approximately 4.5 mm Hg was used to obtain a polymer with a relative viscosity of about 19 LRV. This polymer was analyzed and found to contain 0.53 mole % LISIPG.

EXAMPLE 5

The procedure of Example 1 was repeated, except that the injection rate of LISIPG was adjusted to give 2.0 mole % of LISIPG in polymer, and a finisher pressure of 13–14 mm Hg was used to obtain a polymer with a relative viscosity of about 17 LRV. This polymer was analyzed and found to contain 2.02 mole % LISIPG.

EXAMPLE 6

The procedure of Example 1 was repeated, except that the amounts of lithium acetate buffer were changed. (The points of addition of the lithium acetate can include both addition with the catalyzed glycol stream at line 11 into vessel 1, as well as injection into the monomer line with the LISIPG solution at point 23. Lithium acetate functions as a buffer to control the amount of ether formation as a side reaction in the polymerization process, mainly into diethylene glycol (DEG). Increased levels of lithium in the polymer reduced the amount of DEG, as shown in Table 6.

TABLE 6

(1.4 MOLE % LISIPG IN POLYMER)

| Li Level in Polymer (As ppm Li) | Wt % DEG In Polymer |
|---|---|
| 44 | 5–6 |
| 63 | 5–6 |
| 88 | 3–4 |
| 132 | 1.5–2.0 |
| 170 | 0.8–1.5 |

Increased levels of lithium acetate have caused undesirable color formation in the polymer. A preferred level of lithium acetate has been approximately 125 ppm Li in polymer, which has given an acceptable level (2–3 wt %) of DEG in the polymer.

EXAMPLE 7

The procedure of Example 1 was repeated, except that sodium acetate was used as buffer, and was added in the catalyzed glycol at a molar ratio of 4.4 to 1, sodium acetate to manganese acetate. The polymer formed by this Example was analyzed and found to contain 2.72 wt % DEG with excellent color compared to polymers made with lithium acetate. Polymers in this Example showed an increased pack pressure in spinning. A polymer with an LRV of about 16.9 was produced at a finisher pressure of approximately 4.5 mm Hg.

Some of this polymer was spun into partially oriented yarn using essentially the same procedure as in Example 1. The yarn was collected at approximately 3145 yards per minute windup speed and the yarn properties are shown in Table 7A.

TABLE 7A

| Copol, Mole % | 1.39 |
|---|---|
| DEG, Wt % | 2.73 |
| LRV | 16.9 |
| Spin Speed, ypm (mpm) | 3163 (2842) |
| Windup Speed, ypm (mpm) | 3145 (2876) |
| Denier | 245 |
| Ten, gpd | 2.0 |
| $E_B$, % | 143 |
| Mod, gpd | 22.9 |
| DHS, % | 65 |
| BOS, % | 60 |
| DT, g | 91.9 |
| Draw-Textured Denier | 156 |
| Draw Ratio | 1.59 |
| Drawn Tenacity | 3.0 |
| Drawn $E_B$, % | 31 |

Some of the polymer was also spun essentially similarly, but to provide 34 filaments with a total denier of approximately 75 and at differing speeds to show how a direct-use low shrinkage yarn can be obtained from LISIPG copolymer. These yarns were also spun using conventional S-wrap technology (using a feed roll, a letdown roll and a windup with no intermediate draw step between these rolls). The yarn properties over a range of spin (windup) speeds are shown in Table 7B. As may be seen from these results, to make the desired low shrinkage levels for a direct-use yarn from LISIPG polymer according to the invention, it was preferred to use a windup speed of approximately 5000 yards (4572 meters) per minute.

TABLE 7B (1.4 Mole % LISIPG Fibers)

| ITEM | MOLE % COPOLY | LRV | WIND SPEED | SPIN SPEED | DEN | TEN | $E_B$ | MOD | DHS | BOS | DT |
|---|---|---|---|---|---|---|---|---|---|---|---|
| A | 1.38 | 17.6 | 4000 | 3988 | 75.4 | 2.23 | 104.4 | 32.5 | 33.4 | 30.7 | 44.0 |
| B | 1.38 | 17.5 | 4200 | 4188 | 75.5 | 2.33 | 106.3 | 34.3 | 22.0 | 21.1 | 50.3 |
| C | 1.38 | 17.9 | 4600 | 4588 | 74.6 | 2.37 | 96.8 | 38.5 | 14.2 | 15.0 | 63.0 |

TABLE 7B-continued (1.4 Mole % LISIPG Fibers)

| ITEM | MOLE % COPOLY | LRV | WIND SPEED | SPIN SPEED | DEN | TEN | $E_B$ | MOD | DHS | BOS | DT |
|---|---|---|---|---|---|---|---|---|---|---|---|
| D | 1.39 | 18.5 | 5000 | 4990 | 75.3 | 2.43 | 91.6 | 41.0 | 9.2 | 9.7 | 71.6 |

COMPARISON TABLE 7C (1.4 Mole % Na Salt Fibers)

| ITEM | MOLE % COPOLY | LRV | WIND SPEED | SPIN SPEED | DEN | TEN | $E_B$ | MOD | DHS | BOS | DT |
|---|---|---|---|---|---|---|---|---|---|---|---|
| A | 1.46 | 16.1 | 4000 | 3988 | 75.1 | 2.03 | 112.9 | 30.2 | 42.2 | 40.9 | 44.0 |
| B | 1.46 | 16.1 | 4200 | 4188 | 74.9 | 2.06 | 106.1 | 31.3 | 33.7 | 34.8 | 43.4 |
| C | 1.46 | 16.1 | 4600 | 4588 | 74.8 | 2.32 | 98.3 | 35.9 | 23.5 | 25.1 | 55.8 |
| D | 1.46 | 16.1 | 5000 | 4990 | 75.7 | 2.27 | 88.9 | 39.4 | 17.0 | 17.9 | 66.1 |

By way of contrast, we have provided in COMPARISON TABLE 7C data concerning yarns spun from polymer containing 1.4 mole % sodium salt and made using conventional polyester polymerization catalysts and technology. These show that we could not use such conventional sodium salt polymer to make a similar low shrinkage, direct-use yarn at any of the spinning speeds tested.

When attempts have been made to spin such direct use (low shrinkage) yarns using standard commercial cationically-dyeable compositions of 2 mole % sodium salt, the filament bundles have been too weak to allow spinning of a continuous threadline.

Some LISIPG polymer made essentially as described in Example 7 (but of 18.5 LRV with approximately 3.7 wt % DEG) was also spun and drawn to give a direct use filament yarn as follows. A spinneret was held at such temperature as required to obtain a polymer temperature of 294° C. The filaments were quenched using radial flow of air at about 22° C. (18° C. wet bulb temperature). A spin finish was applied and the filaments were wrapped on a feed roll moving with a surface speed of 1000 yards (914 meters) per minute. The yarn was passed through a steam jet at 225° F. (107° C.) where the yarn was drawn and passed on to draw rolls which were contained in a hot chest and heated to 115° C., and were rotating with a surface speed of 2791 yards (2552 meters) per minute. A finish was applied to the yarn, the yarn filaments were interlaced and then wound on a tube at about 2757 yards (2521 meters) per minute. Yarn data are shown in Table 7D.

By way of contrast, a 15.9 LRV polymer made with 1.4 mole % NASIPG and containing 3.2 wt % DEG was spun and drawn using the same process conditions, and its data are also shown in Table 7D, as are those for a commercially-available cationically dyeable fiber made using conventional polymer technology and containing 2 mole % of sodium salt as a comparative example. These results show that yarns made with LISIPG have superior tenacity versus yarns made with sodium salts.

TABLE 7D

| PROPERTY | 1.4 MOLE % LISIPG | 1.4 MOLE % NASIPG | 2.0 MOLE % Na Salt |
|---|---|---|---|
| LRV | 18.5 | 15.9 | 15.3 |
| DEG, Wt % | 3.7 | 3.2 | ~2.5 |
| Spin Speed, ypm | 1000 | 1000 | 1607 |
| Draw Speed, ypm | 2791 | 2791 | 3147 |
| Windup Speed, ypm | 2757 | 2757 | 3150 |
| Denier | 78 | 76 | 70 |
| Ten, gpd | 3.3 | 3.0 | 2.7 |
| $E_B$, % | 34 | 37 | 37 |
| Mod | 71.5 | 64.5 | 59.5 |
| DHS, % | 17 | 16 | 9 |
| BOS, % | 14 | 13 | 8 |

EXAMPLE 8

Following essentially a similar procedure as described using LISIPG in Example 1, polymer was prepared and melt-spun into filaments from dimethyl terephthalate (DMT) and bis(2-hydroxy ethyl) sodio 5-sulfoisophthalate (NASIPG) (instead of LISIPG) as described hereinafter.

Manganese acetate (MnAc) was used as exchange catalyst (without any LiAc) and mixed with antifoam and ethylene glycol to form a catalyzed glycol stream that was fed into the first reaction vessel 1, via line 11, the amount being adjusted to give approximately 120 ppm Mn in the final polymer.

Sufficient phosphoric acid was added at injection point 21 to give approximately 80–100 ppm P in the polymer. Following injection of $TiO_2$ at injection point 22, a solution of bis(2-hydroxy ethyl) sodio 5-sulfoisophthalate (NASIPG instead of LISIPG)) in glycol was added at injection point 23. Sodium acetate buffer was added to the NASIPG solution. The NASIPG injection rate was adjusted to 2.0 mole % of acid-based units in polymer. The total sodium acetate level was approximately 150 ppm Na in polymer.

In the second vessel 2, the temperature was increased to about 248° C. and the pressure was reduced to about 90 mm Hg with a residence time of about 30 minutes, as glycol was removed.

In the third reaction vessel 3, the temperature was increased to about 274° C. and the pressure was reduced to approximately 30 mm Hg. Glycol was again removed through a vacuum system over a period of about 10 minutes.

In the fourth vessel 4, the temperature was controlled at approximately 282° C. and the pressure was reduced to about 6 mm Hg. After about 200 minutes, some of the polymer was recovered and found to have a relative viscosity of about 12 LRV. Upon analysis, the polymer composition was determined to be composed of acid-based units having a mole ratio of about 97.8/2.2 mole % of T/NASIP and glycol-based units of about 99/1 weight % of ethylene glycol/diethylene glycol.

This polymer was spun into filaments essentially as described in Example 1, except that the spinneret was maintained at a temperature of about 294° C. The filaments were collected at about 3300 yards (3018 meters) per minute. The spun filament bundles had a draw tension of about 88 grams at 185° C. and a 1.71X draw ratio.

EXAMPLE 9

Polymer was prepared and melt spun into filaments from terephthalic acid (TPA), and bis(2-hydroxy ethyl) lithium 5-sulfoisophthalate (LISIPG) and ethylene glycol (2G) with the resulting fibers also containing some DEG that was generated by reaction. 2G and TPA were fed into a first reaction vessel 1 (an esterification reactor) in a mole ratio of approximately 1.1:1.0 2G:T. The temperature was increased to about 280° C. at atmospheric pressure and PET oligomer (HPG) was formed with removal of water and excess ethylene glycol, and passed to a second reaction vessel 2 in a molten stream (HPG) in line 14.

No manganese acetate catalyst was added in this direct esterification process. No polymerization catalyst was added, so this is referred to herein as "catalyst-free" polymerization; some antimony is, however, generally found as a contaminant in the $TiO_2$ delusterant, so any such will be present and amount to 10–30 ppm Sb in the final polymer (containing $TiO_2$). Phosphoric acid was added to obtain approximately 30 ppm P in polymer.

$TiO_2$ delusterant was added at injection point 22 to the molten oligomer (HPG) to give approximately 0.2–0.3 wt % $TiO_2$ in polymer. No additional titration glycol was added. A solution of approximately 20 wt % of LISIPG and lithium acetate was added at injection point 23. The LISIPG stream injection rate was adjusted to give 1.4 mole % LISIPG in polymer. Lithium acetate was injected at injection point 21 as well as added with the LISIPG at 23, to achieve approximately 125 ppm Li in the polymer. The time taken for the molten HPG to pass from injection point 23 to the second reaction vessel 2 was only about 30 seconds. Polymerization conditions used for this process are shown in Table 9A. The polymer obtained was analyzed and found to contain 1.4 mole % LISIPG and approximately 3% by weight of DEG. The polymer had a relative viscosity of about 17–18 LRV.

TABLE 9A

| CONDITIONS | |
|---|---|
| Oligomer Line Temperature, deg. C. | 270 |
| Vessel 2 - | |
| Temperature, deg. C. | 260 |
| Pressure, mm Hg | 120 |
| Vessel 3 - | |
| Temperature, deg. C. | 275 |
| Pressure, mm Hg | 45 |
| Vessel 4 - | |
| Temperature, deg. C. | 280 |
| Pressure, mm Hg | ~3 |
| Polymer Properties - | |
| LRV | 17–18 |
| DEG, Wt % | ~3 |

The resulting polymer was spun using conventional polyester staple melt-spinning technology, essentially as described for Example 1 for Table 1D, except that the spinneret was maintained at approximately 285° C., and a single end of approximately 2800 denier containing 900 filaments was collected at 1500 yards (1372 meters) per minute, and a single end of approximately 3200 denier was collected at 1800 yards (1646 meters) per minute. Multiple ends were combined separately to form tows which were drawn using conventional staple 2-stage draw/anneal/crimping processes to provide crimped fibers with deniers from 1.4 to 1.7 dpf. Data for the drawn fibers are shown in Tables 9B and 9C, respectively.

TABLE 9B

| | | [1500 YPM SPINNING SPEED] | | | | | |
|---|---|---|---|---|---|---|---|
| ITEM | DRAW RATIO | ANNEALING CONDITION | DPF | TEN | $E_B$ | % DH | CPI |
| Steam Annealed | | | | | | | |
| A | 2.28 | 170 psi | 1.70 | 3.60 | 36.5 | 10.3 | 9.1 |
| B | 2.39 | 170 psi | 1.62 | 3.86 | 31.0 | 10.2 | 9.6 |
| C | 2.47 | 170 psi | 1.57 | 4.23 | 15.6 | 10.9 | 11.5 |
| E | 2.47 | 160 psi | 1.56 | 3.93 | 19.8 | 8.7 | 9.9 |
| F | 2.47 | 150 psi | 1.57 | 4.26 | 17.0 | 7.9 | 8.3 |
| G | 2.47 | 180 psi | 1.58 | 4.16 | 19.3 | 9.3 | 11.5 |
| Roll Annealed | | | | | | | |
| H | 2.50 | 170 C | 1.51 | 4.48 | 18.1 | 11.9 | 9.3 |
| I | 2.51 | 160 C | 1.54 | 4.25 | 18.8 | 11.3 | 9.1 |
| J | 2.50 | 180 C | 1.50 | 4.42 | 16.7 | 8.9 | 9.5 |

TABLE 9C

| | | [1800 YPM SPINNING SPEED] | | | | | |
|---|---|---|---|---|---|---|---|
| ITEM | DRAW RATIO | ANNEALING CONDITION | DPF | TEN | $E_B$ | % DH | CPI |
| Steam Annealed | | | | | | | |
| A | 2.34 | 170 psi | 1.50 | 4.20 | 26.7 | 5.4 | 9.6 |
| B | 2.23 | 170 psi | 1.57 | 3.82 | 21.7 | 5.5 | 9.7 |
| C | 2.46 | 170 psi | 1.41 | 4.51 | 15.3 | 5.0 | 9.4 |
| E | 2.41 | 160 psi | 1.43 | 4.71 | 22.1 | 7.1 | 9.3 |
| F | 2.46 | 150 psi | 1.42 | 4.60 | 16.6 | 7.8 | 8.2 |
| G | 2.46 | 180 psi | 1.47 | 4.12 | 16.7 | 5.5 | 9.7 |
| Roll Annealed | | | | | | | |
| H | 2.49 | 170 C | 1.37 | 4.82 | 18.6 | 9.6 | 8.8 |
| I | 2.49 | 160 C | 1.35 | 5.08 | 12.5 | 11.2 | 8.2 |
| J | 2.49 | 180 C | 1.34 | 4.37 | 13.9 | 9.5 | — |

Similar "catalyst-free" polymerization was also performed using NASIPG solutions. Surprisingly, operable conditions for polymerization and spinning could be achieved with low NASIPG concentrations, low residence time after NASIPG injection and without adding antimony oxide or other conventional polymerization catalyst or titration glycol.

EXAMPLE 10

Polymer was prepared using a procedure similar to that described in Example 9 for LISIPG, but using bis(2-hydroxy ethyl) sodio 5-sulfoisophthalate (NASIPG), instead of LISIPG.

$TiO_2$ delusterant was added at injection point 22 to give approximately 0.3 wt % $TiO_2$ in the polymer. A small amount of phosphoric acid may be added at injection point 21. A solution of about 10 wt % NASIPG with sodium acetate was added at injection point 23 to the molten HPG (oligomer) stream which was pumped on through line 14 over a period of about 30 seconds before entering polymerization vessel 2. The flow rate of the NASIPG solution was adjusted to give approximately 2 mole % of NASIPG in the polymer. Process conditions used are shown in Table 10.

TABLE 10

| | CONDITION |
|---|---|
| Line 14 Temperature, deg. C. | 270 |
| Vessel 2 - | |
| Temperature, deg. C. | 265 |
| Pressure, mm Hg | 120 |
| Vessel 3 - | |
| Temperature, deg. C. | 275 |
| Pressure, mm Hg | 46 |
| Vessel 4 - | |
| Temperature, deg. C. | 281 |
| Pressure, mm Hg | 5 |
| Polymer Properties | |
| LRV | 14 |
| DEG, Wt % | 0.9 |

Analysis of the fiber showed 7–10 ppm Sb (because it was a contaminant of the $TiO_2$), with NASIPG level of 1.7 mole %, and DEG level approximately 0.9 wt % in the polymer.

Filaments were spun using the same conditions as would be used for spinning from polymer containing Sb catalyst (and as in Example 9) from polymer of relative viscosity ~14 LRV at approximately 1800 yards (1646 meters) per minute. A single end of approximately 2800 denier yarn containing 900 filaments was collected.

EXAMPLE 11

A 40-lb horizontal autoclave with an agitator, vacuum jets, and a monomer distillation still, located above the clave portion of the autoclave, was used to prepare batches of polyester copolymers containing LISIPG. The monomer still was charged with 39.2 lb of dimethyl terephthalate (DMT) and 27.6 lb of ethylene glycol (2G). Sufficient manganese acetate exchange catalyst was added to obtain approximately 110 ppm Mn in the polymer. In addition, 45 grams of lithium acetate was also added to the still as a buffer to retard the formation of DEG. The temperature of the still was gradually raised to 220° C. and approximately 6200 grams of methanol distillate were recovered. The molten monomer was then dropped from the monomer still to the clave portion of the autoclave.

Then an amount of phosphoric acid solution sufficient to obtain about 94 ppm phosphorus (in the polymer) was added to the clave. Then 725 grams of LISIPG were added (as a 20% by weight solution in 2G) to the clave along with about 250 ml of a 20 wt % slurry of $TiO_2$ (also in 2G). The ingredients were agitated and well mixed and polymerized by increasing the temperature to approximately 273° C. The pressure was reduced to approximately 1 mm Hg over about 2 hours and was held at this condition for approximately 4.3 hr. The polymer was extruded through a ribbon dye, quenched, and cut. Recovered polymer was analyzed and its data are shown in Table 11, under the heading "Catalyst-Free", along with data for polymer prepared essentially similarly except that antimony trioxide was added as polymerization catalyst in sufficient amount to obtain 220 ppm Sb in the polymer.

TABLE 11

| | Catalyst Free | Sb-Catalyzed |
|---|---|---|
| LISIPG, Mole % | 1.4 | 1.4 |
| $TiO_2$, Wt % | 0.32 | 0.31 |
| DEG, Wt % | 1.1 | 1.2 |
| Sb, ppm | 19 | 220 |
| Mn, ppm | 107 | 108 |
| P, ppm | 93 | 94 |

TABLE 11-continued

|  | Catalyst Free | Sb-Catalyzed |
|---|---|---|
| LRV | 23.5 | 22.8 |

These data show the antimony trioxide polymerization catalyst was not required for making the LISIPG-containing polymer.

EXAMPLE 12

Similar procedures were used to prepare batches of polyester copolymers containing NASIP, except that the monomer still was also charged with 420 grams of dimethyl 5-sodio isophthalate (NASIP), sufficient manganese acetate exchange catalyst was added to obtain approximately 100 ppm Mn in polymer, and 36 grams of sodium acetate was added to the still a the buffer to retard formation of DEG. The temperature of the still was gradually raised to 200° C. and approximately 6060 grams of methanol distillate were recovered, before the molten monomer was dropped from the monomer still to the clave portion of the autoclave.

The amount of phosphoric acid solution added was sufficient to obtain 75 ppm phosphorus in the polymer, and about 300 ml of the 20 wt % slurry of $TiO_2$. The ingredients were agitated and well mixed and polymerized by increasing the temperature to approximately 275° C., and the pressure was reduced over about 2 hours and was held at approximately 1 mm Hg for approximately 5.3 hr. Recovered polymer data are shown in Table 12 for both such "Catalyst-Free" polymers and for "Sb-Catalyzed" polymer, with somewhat similar conclusions as in the previous Example, although the "Catalyst-Free" polymer was of lower LRV than the "Sb-Catalyzed" polymer in this Example.

TABLE 12

|  | Catalyst-Free | Sb-Catalyzed |
|---|---|---|
| NASIP, Mole % | 1.4 | 1.4 |
| $TiO_2$, Wt % | 0.34 | 0.39 |
| DEG, Wt % | 0.9 | 1.5 |
| Sb, ppm | 18 | 202 |
| Mn, ppm | 107 | 100 |
| P, ppm | 75 | 86 |
| LRV | 17.4 | 24.2 |

As will have been noted from the comparative results when spinning filaments noted above, use of polymer according to the invention has provided advantages that have not been attainable hitherto using prior art basic-dyeable copolyester that has been commercially available. Thus, novel basic-dyeable polyester filaments and yarns are provided according to the invention. These include draw-texturing feed yarns, comprising partially oriented yarns, especially amorphous spin-oriented yarns of the basic-dyeable copolyester according to the invention but, otherwise, essentially as described in the art search as Petrilie U.S. Pat. No. 3,771,307 or Piazza and Reese U.S. Pat. No. 3,772,872. They also include crystalline spin-oriented yarns, as described, for example, by Knox in U.S. Pat. No. 4,156,071, or by Frankfort and Knox in U.S. Pat. Nos. 4,136,882 and 4,195,051, for homopolymer yarns in those patents, but, of course, using copolyester polymer according to the present invention. They also include filaments of low dpf, especially such as we spun and/or draw to subdeniers, as described in U.S. Pat. Nos. 5,250,245, 5,288,553, by way of example. Each of the terms filaments and fibers are used herein broadly, as context allows, and are not intended to be mutually exclusive. The basic-dyeable copolyester polymer of the invention may be used to make cut fiber (often referred to as staple) and yarns and other products therefrom, or may be used to make shaped articles other than fibers, e.g., bottles, as described in the art.

Various advantages obtained by the present invention have been indicated in the Examples and elsewhere hereinabove. Avoiding incorporating the amounts of antimony heretofore used commercially (in the form of antimony trioxide, as polymerization catalyst) is expected to be a very significant advantage in commercial operations, for instance in reducing wipe cycles, and was entirely unexpected by us. The unexpected catalytic activity we have demonstrated also seems to explain, in retrospect, many practical problems experienced hitherto in making basic-dyeable copolyester polymer commercially from the sodium salt of 5-sulfoisophthalic acid. We have also obtained very significant advantages from using a lithium salt (of 5-sulfoisophthalic acid) instead of using the sodium salt which has been used exclusively to make basic-dyeable copolyester polymer in commercial practice. The art did also disclose in the 1970's that lithium aromatic sulfonates imparted deeper dyeability to linear synthetic polyester than other alkali metal aromatic sulfonates, e.g., by Davis et al., Juelke, and Juelke et al., in U.S. Pat. Nos. 3,706,712 and 4,042,618, 3,712,919, and 3,816,520. To summarize, the present invention is based on unexpected findings in relation to well-established commercial practices and prejudices, the full consequences of which are likely to take a long time and considerable commercial experience to evaluate properly.

We claim:

1. A continuous process for preparing basic-dyeable polyester polymer, involving reacting terephthalic acid or dimethyl terephthalate with excess glycol to form a low molecular weight glycollate of terephthalic acid (HPG) in a first reaction zone, passing a stream of molten HPG from said first reaction zone to a condensation polymerization zone, carrying out condensation polymerization of said molten HPG to form the desired polyester polymer in molten state in said condensation polymerization zone, and cooling the resulting polymer to a solid, wherein an improvement comprises making delustered basic-dyeable polyester polymer by metering into said stream of molten HPG titanium dioxide, in amount 0.1 to 2 percent by weight, followed by metering into the resulting stream of molten HPG well-mixed with titanium dioxide a metal sulphonate salt of a glycollate of isophthalic acid, in amount 0.5 to 5 mole percent, said percent amounts being calculated with respect to the polyester polymer that is prepared.

2. A process for preparing basic-dyeable polyester polymer, involving reacting terephthalic acid or dimethyl terephthalate with excess glycol to form a low molecular weight glycollate of terephthalic acid (HPG), carrying out condensation polymerization of said HPG in molten state to form the desired polyester polymer in molten state, and cooling the resulting polymer to a solid, wherein an improvement comprises making delustered basic-dyeable polyester polymer by mixing into said molten HPG titanium dioxide, in amount 0.1 to 2 percent by weight, followed by mixing into the resulting molten HPG well-mixed with titanium dioxide a metal sulphonate salt of a glycollate of isophthalic acid, in amount 0.5 to 5 mole percent, said percent amounts being calculated with respect to the polyester polymer that is prepared.

3. A continuous process for preparing basic-dyeable polyester polymer, involving reacting terephthalic acid or dimethyl terephthalate with excess glycol to form a low molecular weight glycollate of terephthalic acid (HPG) in a first reaction zone, passing a stream of molten HPG from said first reaction zone to a condensation polymerization zone, carrying out condensation polymerization of said molten HPG to form the desired polyester polymer in molten state in said condensation polymerization zone, and cooling the resulting polymer to a solid, wherein an improvement comprises making basic-dyeable polyester polymer containing less than 100 ppm of antimony by metering into said stream of molten HPG a metal sulphonate salt of a glycollate of isophthalic acid, in amount 0.5 to 5 mole percent, said percent amount being calculated with respect to the polyester polymer that is prepared.

4. A process for preparing basic-dyeable polyester polymer, involving reacting terephthalic acid or dimethyl terephthalate with excess glycol to form a low molecular weight glycollate of terephthalic acid (HPG), carrying out condensation polymerization of said HPG in molten state to form the desired polyester polymer in molten state, and cooling the resulting polymer to a solid, wherein an improvement comprises making basic-dyeable polyester polymer containing less than 100 ppm of antimony by mixing into said molten HPG a metal sulphonate salt of a glycollate of isophthalic acid, in amount 0.5 to 5 mole percent, said percent amount being calculated with respect to the polyester polymer that is prepared.

5. A process according to any one of claims 1 to 4, wherein the metal of the metal salt is lithium.

6. A process according to any one of claims 1 to 4, wherein the metal of the metal salt is sodium.

7. A basic-dyeable ethylene terephthalate copolyester containing 0.5 to 5 mole percent of a metal sulfonate salt of a glycollate of isophthalic acid, and containing less than 100 ppm of antimony.

8. A copolyester according to claim 7, containing less than 50 ppm of antimony.

9. A copolyester according to claim 7 or 8, wherein the metal of the metal salt is lithium.

10. A copolyester according to claim 7 or 8, wherein the metal of the metal salt is sodium.

* * * * *